US010404362B1

(12) United States Patent
Xu et al.

(10) Patent No.: US 10,404,362 B1
(45) Date of Patent: Sep. 3, 2019

(54) FAULT DETECTION AND REPORTING IN LINE MONITORING SYSTEMS

(71) Applicant: SubCom, LLC, Eatontown, NJ (US)

(72) Inventors: Yunlu Xu, Howell, NJ (US); Richard Kram, Ocean, NJ (US); Jonathan M. Liss, Marlboro, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 15/937,241

(22) Filed: Mar. 27, 2018

Related U.S. Application Data

(60) Provisional application No. 62/633,678, filed on Feb. 22, 2018.

(51) Int. Cl.
| | | |
|---|---|---|
| *H04B 10/00* | (2013.01) | |
| *H04B 10/071* | (2013.01) | |
| *H04B 10/25* | (2013.01) | |
| *H04B 10/079* | (2013.01) | |
| *H04B 10/035* | (2013.01) | |

(52) U.S. Cl.
CPC ......... *H04B 10/071* (2013.01); *H04B 10/035* (2013.01); *H04B 10/0791* (2013.01); *H04B 10/25* (2013.01)

(58) Field of Classification Search
USPC ....................................................... 398/9–38
See application file for complete search history.

(56) References Cited

U.S. PATENT DOCUMENTS

| | | | | |
|---|---|---|---|---|
| 6,134,032 A | * | 10/2000 | Kram | H04B 10/035 398/1 |
| 6,236,478 B1 | * | 5/2001 | Stoll | H04B 10/0793 398/27 |
| 6,965,736 B1 | * | 11/2005 | Hanik | H04B 10/07953 398/14 |
| 7,809,279 B2 | * | 10/2010 | Zhang | H04B 10/035 356/73.1 |
| 8,837,935 B2 | * | 9/2014 | Mahlab | H04B 10/0795 398/25 |
| 9,749,041 B2 | * | 8/2017 | Kram | H04B 10/0773 |
| 9,871,582 B2 | * | 1/2018 | Djukic | H04B 10/079 |
| 9,888,397 B1 | * | 2/2018 | Puranik | H04W 24/04 |

(Continued)

OTHER PUBLICATIONS

International Search Report and Written Opinion dated Mar. 14, 2019 for PCT application, PCT/US2019/018720 filed Feb. 20, 2019.

*Primary Examiner* — Agustin Bello

(57) ABSTRACT

In general, a system and method consistent with the present disclosure provides automated line monitoring using a machine learning fault classifier for determining whether a signature associated with the high loss loopback (HLLB) data matches a predetermined fault signature. The fault classifier may be applied to signatures generated in response to line monitoring signals of two different wavelengths. A fault may be reported only if the fault classifier indicates a fault in response to the signature for both wavelengths. A second fault classifier may also be used and a fault may be reported only if both the first and second fault classifiers indicate a fault in response to the signature for both wavelengths. A system consistent with the present disclosure may also, or alternatively, be configured to report the value of a pump degradation, span loss, or repeater failure fault, and may also, or alternatively, report the directionality of a span loss fault or the location of a fiber break fault.

20 Claims, 7 Drawing Sheets

(56) References Cited

U.S. PATENT DOCUMENTS

| | | | |
|---|---|---|---|
| 10,050,737 B1* | 8/2018 | Al Sayeed | H04J 14/021 |
| 2004/0165886 A1* | 8/2004 | Barwicz | H04B 10/07953 |
| | | | 398/33 |
| 2008/0122617 A1* | 5/2008 | Browning | G02B 6/4416 |
| | | | 340/541 |
| 2008/0253777 A1* | 10/2008 | Delve | H04L 25/03019 |
| | | | 398/208 |
| 2009/0028550 A1* | 1/2009 | Zhang | H04B 10/035 |
| | | | 398/16 |
| 2009/0202237 A1* | 8/2009 | Zhang | H04B 10/035 |
| | | | 398/6 |
| 2009/0324249 A1* | 12/2009 | Zhang | H04B 10/035 |
| | | | 398/177 |
| 2010/0316375 A1* | 12/2010 | Kram | H04B 3/44 |
| | | | 398/25 |
| 2011/0157687 A1* | 6/2011 | White | H01S 3/06754 |
| | | | 359/334 |
| 2013/0129343 A1* | 5/2013 | Kram | H04B 10/0773 |
| | | | 398/17 |
| 2016/0234582 A1* | 8/2016 | Ronald | H04Q 11/0067 |
| 2017/0097860 A1* | 4/2017 | Pang | G06F 11/079 |
| 2017/0163337 A1* | 6/2017 | Djukic | H04B 10/079 |
| 2017/0338887 A1* | 11/2017 | Rao | H04Q 11/0005 |
| 2018/0219618 A1* | 8/2018 | Paraschis | H04B 10/07953 |
| 2018/0220210 A1* | 8/2018 | Paraschis | H04Q 11/0066 |
| 2018/0248771 A1* | 8/2018 | Cote | H04L 41/0893 |
| 2018/0248905 A1* | 8/2018 | Cote | G06K 9/627 |
| 2018/0359160 A1* | 12/2018 | Calo | H04L 41/5035 |

* cited by examiner

FAULT DETECTION AND REPORTING IN LINE MONITORING SYSTEMS

CROSS-REFERENCE TO RELATED APPLICATIONS

The present application claims the benefit of the filing date of U.S. Provisional Application Ser. No. 62/633,678, filed Feb. 22, 2018, the teachings of which are hereby incorporated herein by reference.

TECHNICAL FIELD

The present application relates to communication systems and, more particularly, to a system and method for fault detection and reporting in line monitoring systems.

BACKGROUND

Subsea optical communication systems require routine monitoring to guarantee their performance and minimize potential loss of service. Monitoring generally involves an attempt to detect wet plant faults and possibly aggressive threats at an early stage. Currently established monitoring technologies include the use of line monitoring systems (LMS) to detect loopback signal peaks looped back through loopback paths associated with each undersea repeater and each terminal. The loopback signals can be either high loss loopback (HLLB) signals or optical time domain reflectometry (OTDR) signals.

When there is a change in performance along the optical path, a change occurs in the amplitudes of the loopback signals associated with the repeaters surrounding the fault location. The changes present distinct patterns which may be utilized to identify fault conditions. Such fault conditions include, for example, changes in fiber span loss, changes in optical amplifier pump laser output power, and fiber breaks.

Some approaches to recognizing fault conditions based on a corresponding fault signature include utilizing automatic signature analysis (ASA) implementing a finite state machine for pattern analysis. Unfortunately, these existing ASA-based fault analysis techniques can detect relatively large changes in the transmission system, but often lack accuracy to report small changes that may indicate degraded performance of a particular element over time. These techniques are also not able to report the values of detected faults, such as the pump output power loss, or fiber span loss, and can require multiple data set collections to average out noise in the system.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent with the present disclosure provides automated line monitoring in an optical communication system using high loss loopback (HLLB) data. The line monitoring may be performed using a machine learning fault classifier for determining whether a signature associated with the HLLB data matches a predetermined fault signature. A line monitoring system may send line monitoring signals at one or more different wavelengths and the fault classifier may be applied to signatures generated in response to each of the two wavelengths. In some embodiments, using line monitoring signals at multiple wavelengths provides higher accuracy. A fault may be reported only if the fault classifier indicates a fault in response to the signature for both wavelengths. A second fault classifier may also be used and a fault may be reported only if both the first and second fault classifiers indicate a fault in response to the signature for both wavelengths. Use of a machine learning fault classifier and/or multiple fault classifiers consistent with the present disclosure allows for detection of small changes in the HLLB data thereby improving the accuracy and reliability of fault reporting.

A system consistent with the present disclosure may also, or alternatively, be configured to report the value of a fault. For example, the value of a pump degradation fault may be determined by adding a fault signature to a previous fault signature injected into baseline data and calculating the amplitude of the resulting combined fault signature. The directionality and/or value of a span loss fault may be determined by sending an OTDR signal from the line monitoring system and indicating the directionality or value of the span loss fault in response to a change in amplitude in the received OTDR data signal. The value of a repeater failure and the location of a fiber break may also or alternatively be reported. A system consistent with the present disclosure may also, or alternatively, be configured to analyze faults using a voting algorithm to reduce the probability of occurrence of a false fault report.

Figure 1:
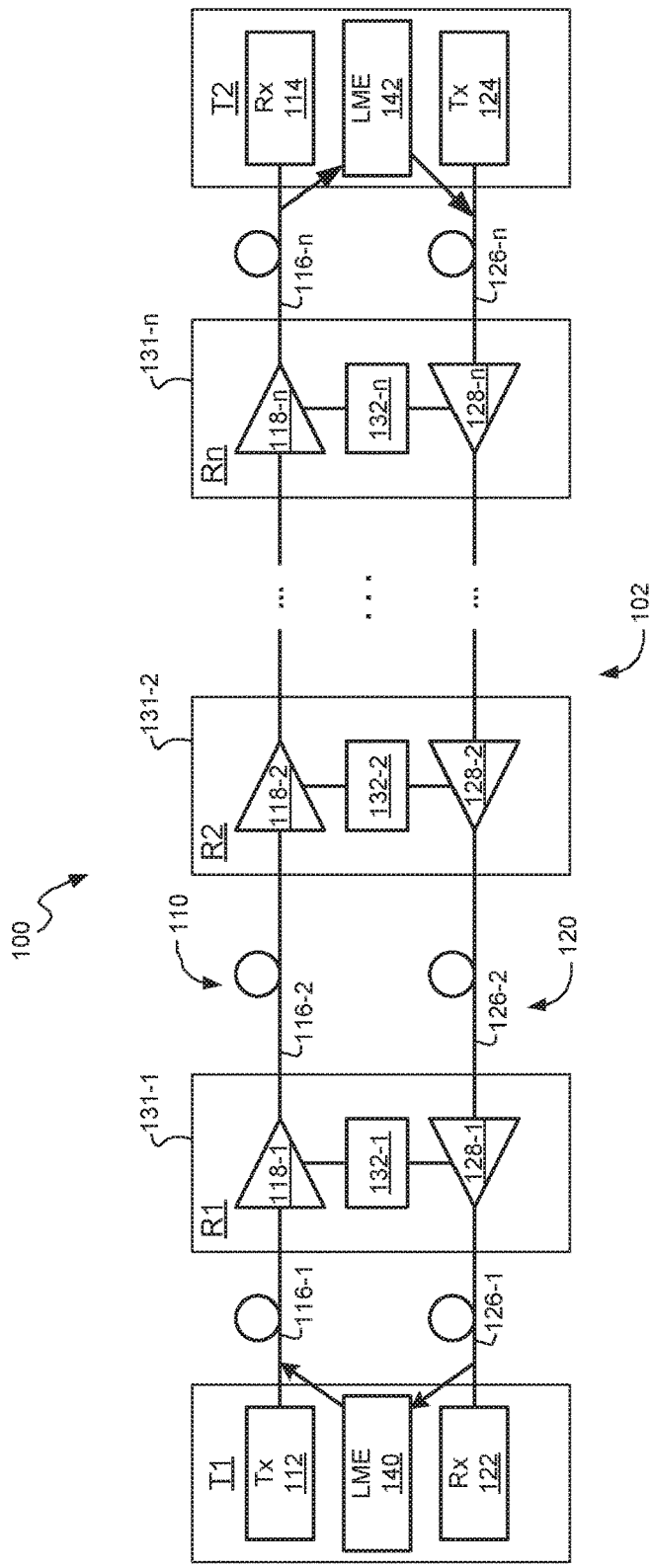
FIG. 1 is a simplified block diagram of one exemplary embodiment of a system consistent with the present disclosure.

FIG. 1 is a simplified block diagram of one exemplary embodiment of WDM transmission system 100 consistent with the present disclosure. In general, the system 100 may be configured to calculate a loop gain value associated with each repeater/amplifier using LMS signals sent one end, or from both ends, of a bi-directional transmission path 102. Those of ordinary skill in the art will recognize that the system 100 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

As shown, the system 100 may include a first terminal T1 and second terminal T2 coupled by two unidirectional optical paths 110, 120, which together form the bi-directional optical transmission path 102. The first terminal T1 is coupled to a first end of the transmission path 102 and the second terminal T2 is coupled to a second end of the transmission path 102. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The optical path 110 may carry optical data on a plurality of channels (or wavelengths) in one direction from a transmitter 112 in the terminal T1 to a receiver 114 in the terminal T2. The optical path 120 may carry optical data on a plurality of channels (or wavelengths) in a direction opposite from the direction associated with path 110 from a transmitter 124 in the terminal T2 to a receiver 122 in the terminal T1. With respect to terminal T1, the optical path 110 is an outbound path and the optical path 120 is an inbound path. With respect to terminal T2, the optical path 120 is an outbound path and the optical path 110 is an inbound path. The optical path 110 may include an alternating concatenation of optical fibers 116-1 to 116-$n$ and optical amplifiers 118-1 to 118-$n$, and the optical path 120 may include an alternating concatenation of optical fibers 126-1 to 126-$n$ and optical amplifiers 128-1 to 128-$n$.

The optical path pair (e.g., optical paths 110, 120) may include sets of amplifier pairs 118-1 to 118-$n$ and 128-1 to 128-$n$ disposed within housings 131-1 to 131-$n$ of associated repeaters R1 . . . Rn and connected by pairs of optical fibers 116-1 to 116-$n$ and 126-1 to 126-$n$. The pairs of optical fibers 116-1 to 116-$n$ and 126-1 to 126-$n$ may be included in an optical fiber cable together with fibers supporting additional path pairs. Each repeater R1 . . . Rn may include a pair of amplifiers 118-1 . . . 118-$n$ and 128-1 . . . 128-$n$ for each supported path pair. Optical amplifiers 118-1 . . . 118-$n$ and 128-1 . . . 128-$n$ are illustrated in simplified form may include one or more erbium doped fiber amplifiers (EDFAs) or other rare earth doped fiber amplifiers, Raman amplifiers or semiconductor optical amplifiers.

A HLLB path 132-1 to 132-$n$ may be coupled between optical paths 110, 120, for example, in one or more of the housings 131-1 to 131-$n$ of the repeaters R1 . . . Rn, and may include, for example, one or more passive optical coupling components, as will be described in greater detail below. A variety of HLLB path configurations useful in a system consistent with the present disclosure are known. Also, although the each of the repeaters R1 . . . Rn is shown is shown as having an associated HLLB path 132-1 to 132-$n$, the HLLB paths may be located in the terminals T1, T2 and/or in other locations and/or may not be located in every repeater R1 . . . Rn. In some embodiments, the HLLB paths 132-1 to 132-$n$ may be symmetric in operation, i.e., the function that describes the percent of optical power at each wavelength transferred from path 110 to path 120 by a HLLB path 132-1 is the same as the function that describes the percent of optical power at each wavelength transferred from path 120 to path 110 by the HLLB path 132-1. Alternatively, one or more HLLB paths may not be symmetric and different HLLB paths may have different transfer functions.

In the illustrated exemplary embodiment, line monitoring equipment (LME) 140, 142 is located at both of the terminals T1, T2 to provide HLLB monitoring of the path pair 110, 120. The LME 140 may launch one or more LME test signals, e.g. at different wavelengths and/or different frequencies, into one optical path 110 (e.g., an outbound optical path with respect to terminal T1). Each of the HLLB paths 132-1 to 132-$n$ may couple a sample of the LME test signals propagating in optical path 110 into the forward propagating direction of the other optical path 120 (e.g., an inbound optical path with respect to terminal T1). The LME 140 may then receive and measure the samples to detect changes in loop gain as an indication of a fault in the system. The received samples of the LME test signals received through HLLB paths 132-1 to 132-$n$ in response to LME test signals are referred to herein as LME loopback data or simply loopback data.

The LME 142 may launch one or more LME test signals, e.g. at different wavelengths and/or different frequencies, into one optical path 120 (e.g., an outbound optical path with respect to terminal T2). HLLB paths 132-1 to 132-$n$ may couple a sample of the LME test signals propagating in optical path 120 into the forward propagating direction of the other optical path 110 (e.g., an inbound optical path with respect to terminal T2). The LME 142 may then receive and measure the samples (loopback data) to detect changes in loop gain as an indication of a fault in the system. A variety of transmitter and receiver configurations for the LME 140, 142 for transmitting LME test signals and receiving and measuring loopback data are known.

Figure 2:
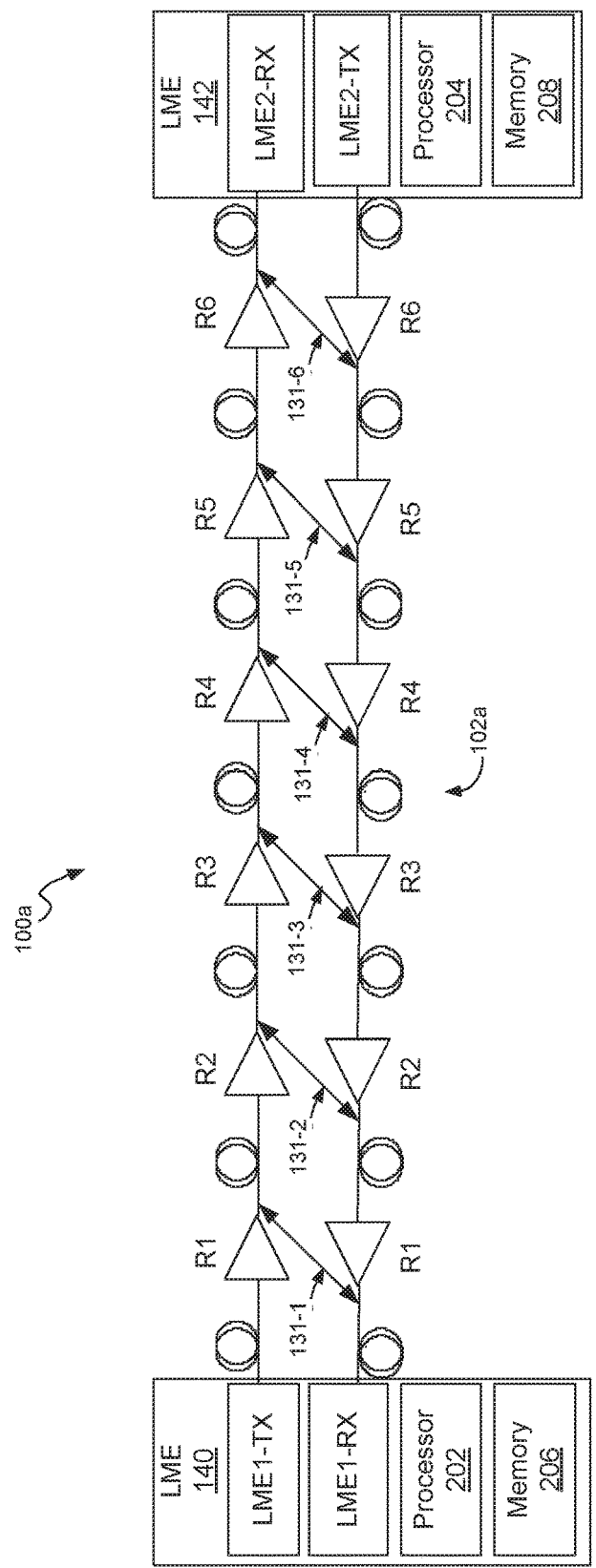
FIG. 2 simplified block diagram of another exemplary embodiment of a system consistent with the present disclosure.

The LME 140, 142 may calculate differential loop gain (DLG) from the loopback data and compare the measured differential loop gain to a baseline differential loop gain to obtain a differential of the differential loop gain (dDLG). The baseline differential loop gain may be calculated from baseline loopback data obtained when the system was without or fault and may include a previous fault injected therein. Differential loop gain and the differential of the differential loop gain may be explained with reference to FIG. 2, for example. FIG. 2 diagrammatically illustrates a portion of a system 100a consistent with the present disclosure including a first LME 140 and a second LME 142 coupled at opposite ends of a transmission path 102a. The system 100a may be configured as described in connection with FIG. 1, except for simplicity and ease of explanation the optical signal transmitters are omitted and only the LME 140, 142 are shown at opposite ends of the transmission path 102a. Also for simplicity and ease of explanation, the illustrated exemplary embodiment includes six repeaters, R1 . . . R6, each of which includes an associated symmetric HLLB path 131-1 . . . 131-6 indicated by the bi-directional arrows extending between the amplifier pair of each repeater R1 . . . R6.

The LME 140 includes an LME test signal transmitter LME1-TX that transmits an LME test signal on the transmission path 102a and an LME test signal receiver LME1-RX that receives loopback data in response to the LME test signal from the LME 140. The LME 142 includes an LME test signal transmitter LME2-TX that transmits an LME test signal on the transmission path 102a and an LME test signal receiver LME2-RX that receives loopback data in response to the LME test signal from the LME 142.

The LME 140, 142 may each also include an associated processor 202, 204 for analyzing loopback data to determine whether the data indicates a fault, executing instructions associated with the fault classifiers, training a machine learning based fault classifier, calculating and reporting fault values, communicating faults and fault values to a remote device, etc. as described herein. In addition, the LME 140, 142 may each include associated computer readable memory 206, 208 for storing predetermined fault signatures, fault values, instructions for executing fault classifiers, etc. as described herein. Although the processors 202, 204 and memory 206, 208 are illustrated herein as being incorporated into the LME 140, 142, it is to be understood that they may be provided in a remote location or distributed locations.

The loopback data generated in response to the LME test signals may be referenced using the notation HLLBi,j, where i is the terminal where the LME test signal originates (i.e. either T1 or T2 in FIG. 1) and j is the loopback path 132-$j$ associated with the data. For example, $HLLB_{T1,3}$ refers to the loopback data obtained from an LME test signal transmitted from the LME test signal transmitter LME1-TX through the loopback path 131-3 and received by the LME test signal receiver LME1-RX. In an embodiment, accumulated noise along the transmission line that is represented within the loopback data 308 may be reduced or otherwise minimized using differential loop gain (DLG). Differential loop gain shows the optical gain between two of the repeaters R1 . . . R6. To this end, differential loop gain for the $j^{th}$ repeater may be given by:

$$DLG_j = HLLB_{T1,j} - HLLB_{T1,j-1} = HLLB_{T2,j-1} - HLLB_{T2,j} \quad \text{Equation (1)}$$

The differential loop gain data may then be compared by the processor 202 or 204 in the LME 140 or 142 to a baseline differential loop gain data calculated from the loopback data for WDM transmission 100a system when the WDM transmission system 100a is without a fault. The baseline differential loop gain data may be stored in computer-readable memory 206 or 208. The comparison may simply include subtracting the differential loop gain data $(DLG_j)_{Data}$ for the WDM system 100a resulting from Equation (1) from the baseline differential loop gain data $(DLG_j)_{Baseline}$ for the WDM system 100a to derive the differential of differential loop gain (dDLG). The differential of differential loop gain may therefore be given by:

$$dDLG_j = (DLG_j)_{Data} - (DLG_j)_{Baseline} \quad \text{Equation (2)}$$

HLLB Data Set Collection and Analysis

The loopback data can be measured for at least one optical frequency/wavelength of the LME test signal within the transmission band of the optical path, and in some cases at two or more wavelengths. In one specific example embodiment, the high and low channel wavelengths (e.g., the minimum and maximum wavelengths, respectively) for a given bandwidth may be selected as the test signal channel wavelengths. Generation of the loopback data may include measurement from each terminal site, e.g., T1 and T2. Thus, loopback data may include multiple HLLB data sets, each data set being collected in response to an associated LME test signal. Each time an LME test signal is sent and a corresponding HLLB data set is collected may be referred to herein as a "run." Multiple runs may be used to determine whether a fault has occurred in a system. In some cases, the loopback data may include at least one or more of a single data set for each branch fiber pairs, and two data sets from trunk fiber pairs, e.g., representing each direction of propagation. In addition, the loopback data may include one or more data sets from target portion(s) of the WDM transmission system when a specific portion of the transmission system is monitored. Note, for C+L fiber pairs, HLLB data sets may be measured in both the C-band and L-band.

In embodiments consistent with the present disclosure, analysis may be conducted by a processor 202 and/or 204 in the LME 140 and/or 142 using the differential of differential loop gain data (dDLG). In scenarios where the WDM transmission system 100 is without fault, the differential of differential loop gain values fluctuate at about zero. A fault condition in the WDM transmission system 100 may cause the differential of the differential loop gain data to have a unique signature.

Figure 3:
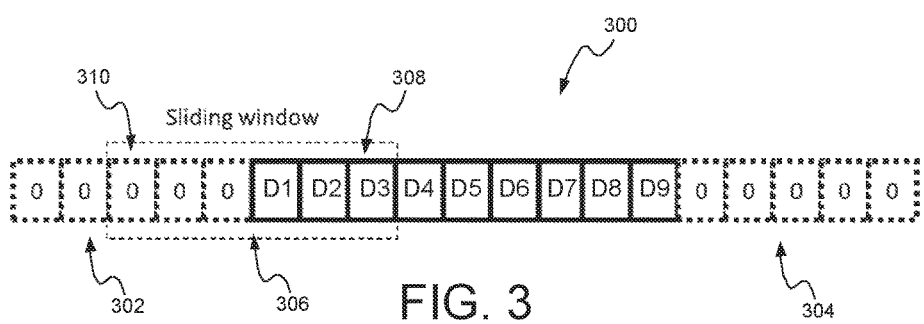
FIG. 3 diagrammatically illustrates a data set and a sliding window useful in analyzing the data set in an embodiment consistent with the present disclosure.

In embodiments consistent with the present disclosure, it has been found that at most six (6) points of dDLG data are required to fully show the signature of a fault. The dDLG data may thus be analyzed by sequentially analyzing six dDLG data points at a time in a processor 202 and/or 204 of the LME 140 and/or 142 using a sliding window with a length of six dDLG data points. FIG. 3, for example, diagrammatically illustrates nine dDLG data points represented by blocks D1 . . . D9 for a WDM system consistent with the present disclosure including nine loopback paths, e.g. in associated repeaters, terminals or other equipment. Each dDLG data point D1 . . . D9 is associated with a loopback path in the system and the dDLG data point immediately adjacent to that dDLG point is associated with an immediately adjacent loopback path. The dDLG data points D1, D9 at the end of data set are associated with loopback paths closest the shore at opposite ends of the system. To facilitate evaluation of fault signatures associated with faults near the shore, a number of leading and trailing zero values may be added to the dDLG data set. In the illustrated embodiment, for example, five leading 302 and trailing 304 zero values are added to the dDLG data set.

The sliding window 306 may be moved so that each sequential group of six dDLG data points D1 . . . D9 and leading 302 or trailing 304 zeros is analyzed for a fault signature. In the embodiment of FIG. 3, for example, nine total sequential data sets would be captured and analyzed for presence of a fault signature. The sliding window 306 would be moved from left to right in FIG. 3 starting with the first dDLG data point D1 in the last position 308 of the sliding window 306 and moving one data point, or leading or trailing zero, at a time until the last dDLG point D9 is in the first position 310 of the sliding window 306. In FIG. 3, the sliding window 306 is shown in a position to capture the third of the nine sequential dDLG data sets.

Each of the dDLG data sets is analyzed using one or more fault classifiers to report a number ranging from 0-1 to reflect the similarity between the baseline DLG data and the measured DLG data. In some embodiments consistent with the present disclosure, accuracy may be improved by using dDLG data sets for two different wavelengths for the LME test signal, e.g. wavelengths at opposite ends of the system bandwidth, and/or two different fault classifiers may be used to analyze the data sets for each dDLG data set. A fault may be reported, e.g. to the LME user or to a remote computer, only when the two fault classifiers indicate a fault at the same time.

The fault classifiers may be implemented using any known method of pattern recognition. In embodiments consistent with the present disclosure, a fault classifier may be implemented using machine learning. A variety of machine learning technologies are well known, including, for example, decision tree learning, association rule learning, inductive logic programming, support vector machines, etc.

In embodiments consistent with the present disclosure, machine learning may be implemented using a known artificial neural network, such as a two-layer convolutional neural network. In such an embodiment, the coefficients of the fault classifier may initially be set to non-zero random numbers that are automatically adjusted during a training process. The training process may include providing a training input. The training input may include the dDLG data for the system, with or without partial or complete fault signatures, combined with white noise. The expected output resulting from the training input is the possibility of fault or non-fault.

FIGS. 4A-4D, for example, are plots of dDLG data used as training inputs for a two-layer convolutional neural network for producing a fault classifier. The plots in FIGS. 4A-4D are of amplitude (dB) of dDLG value for a WDM system vs. dDLG#. The dDLG # represents the loopback path number in the WDM system associated with the dDLG data, i.e. dDLG#0 is the dDLG data for the first loopback path in the system, the dDLG#1 is the dDLG data for the second loopback path in the system, i.e. the next loopback path adjacent to the first loopback path, and so on.

Figure 4A:
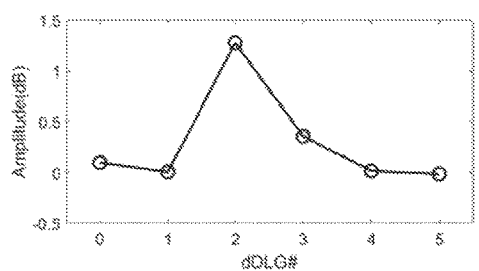
FIGS. 4A-4D include plots of differential of differential loop gain (dDLG) data used as training inputs for an embodiment consistent with the present disclosure.
Figure 4B:
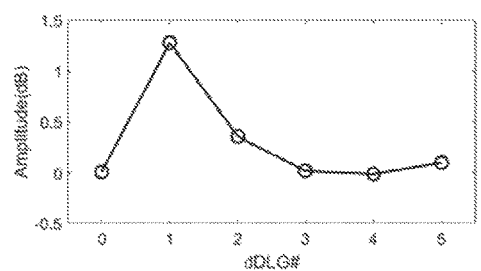
Figure 4C:
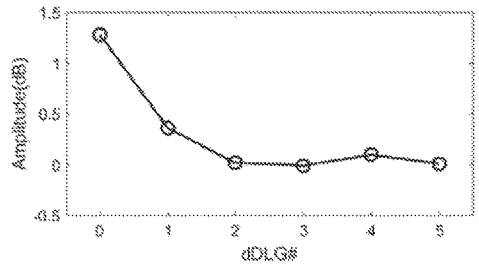
Figure 4D:
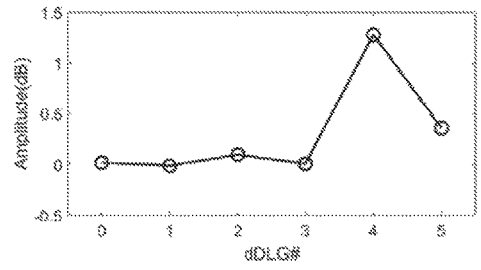

In the illustrated example, the plot in FIG. 4A may represent a complete fault signature (using a dDLG data) set for a span loss in the system occurring between the first and second loopback paths, while FIGS. 4B-4D represent incorrect or partial fault signatures for the span loss. In response to the training inputs 4A-4D to the neural network, the network is trained by setting the expected possibilities of span loss between the first and second loopback paths to be 100%, 0%, 0% and 0%, respectively. The neural network may be trained using complete and partial fault signatures for each type and location of expected fault in the system.

Figure 5:
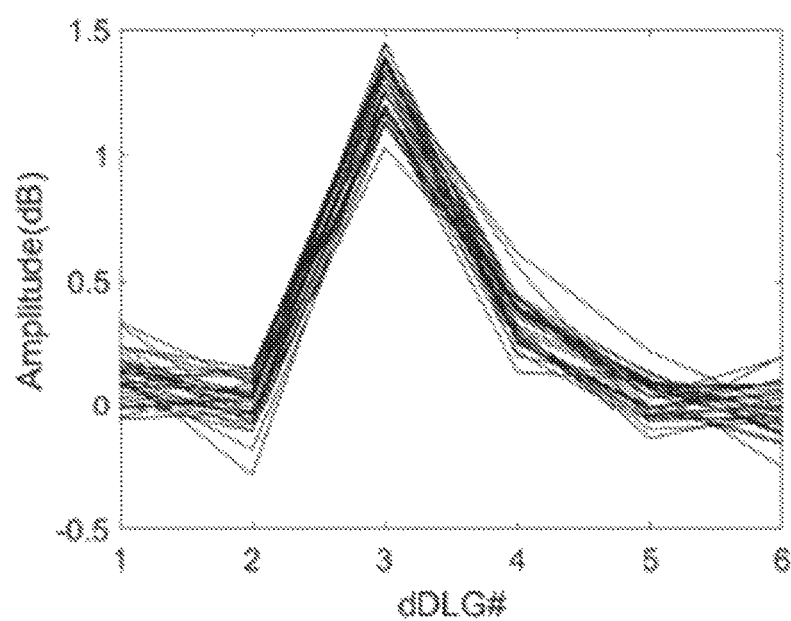
FIG. 5 includes plots of dDLG data for a complete fault signature with different white noise values added to the fault signature for an embodiment consistent with the present disclosure.

In embodiments of a system and method consistent with the present disclosure, noise (e.g. white noise) may be added to the training input to improve performance of the neural network under noise conditions. FIG. 5, for example, includes plots of amplitude (dB) vs. dDLG# for the complete fault signature shown in FIG. 4A with different white noise values added to the fault signature. In response to the each of the inputs represented by the plots in FIG. 5A, the network may be trained by setting the expected possibility of span loss between the first and second loopback paths to be 100% to address the existence of noise in the system. The level of the noise added to the training input for each fault signature may match the expected noise level of signals in the WDM system. The neural network may be trained using fault signatures with added noise for each type and location of expected fault in the system.

In embodiments consistent with the present disclosure, both training data and testing data may be used. The training data may be used to train the network to recognize fault signatures, and the testing data may be used to test the performance of the network. In some embodiments the possibility of faults for two wavelengths of the LME test signal should exceed a predefined fault threshold to report a fault. The training of the network using the training data may be continued until performance demonstrated by the testing data exceeds an acceptable rate of correctly reporting a fault (the correct rate). In some embodiments the correct rate may be set to greater than 99%.

Some embodiments consistent with the present disclosure may use two fault classifiers and a fault may be reported only when both fault classifiers indicate a fault at the same time, e.g. for both of a short and long wavelength LME signal. Using two fault classifiers provides additional reliability. In some embodiments, the first classifier may be a machine learning classifier, as described above, and a second classifier may be implemented using a finite state machine.

A variety of finite state machine configurations are known. In some embodiments consistent with the present disclosure, a finite state machine may be implemented using the following relationship:

$$dDLG_i = X_i \cdot dDLG_{i-1} + Y_i \quad \text{Equation (3)}$$

Where i ranges from 0 to the number of dDLG data points, and $X_i$ and $Y_i$ are constants. The values of the constants $X_i$ and $Y_i$ can be estimated by fitting equation (3) above to training data used for the neural network classifier described above. For each value of i, the maximum $(X_{i,max})$ and minimum $(X_{i,min})$ values of X may be determined from the training data and the maximum $(Y_{i,max})$ and minimum $(Y_{i,min})$ values of Y may be determined from the training data. The finite state machine classifier may then be implemented to report a fault only if, for all values of i in the dDLG data sets for both the short wavelength and the long wavelength LME signals, the following relationship is satisfied:

$$X_{i,min} \cdot dDLG_{i-1} + Y_{i,min} \leq dDLG_i \leq X_{i,max} \cdot dDLG_{i-1} + Y_{i,max} \quad \text{Equation (4)}$$

Advantageously, implementing a fault classifier in a system and method consistent with the present disclosure using a machine learning technology, such as a neural network, allows small changes in signatures to be detected while providing a correct result. Impacts of noise may be taken into account by training machine learning technology to account for noise. Even small changes beyond the contribution of noise can be considered in reporting of a fault. Also, using two fault classifiers and reporting a fault only when both fault classifiers indicates a fault can provide further reliability. This can provide more accurate and reliable fault classification than known systems.

Fault Value Reporting

A system and method consistent with the present disclosure may also, or alternatively, be configured to report the value of an identified fault. With respect to a pump laser degradation fault, for example, it is known that pump laser degradation results in a non-linear loss that cannot be handled simply by re-baselining a system. However the value of any single pump degradation (SPD) may be represented by the summation of the absolute value of the dDLG fault signature as:

$$SPD = f[\text{sum}(|dDLG|)] \quad \text{Equation (5)}$$

To overcome the challenges associated with re-baselining a non-linear loss resulting from pump laser degradation, in embodiments consistent with the present disclosure, accurate calculation of pump degradation may involve recording the fault signature (dDLG data) for the system each time a pump degradation is detected. In future runs of the LME test signals, the recorded signature is temporarily injected into the baseline data. If a new pump degradation is detected at the same position, the new signature (based on the temporary baseline) maybe added to the old signature to form a full signature for use in fault value prediction.

Figure 6A:
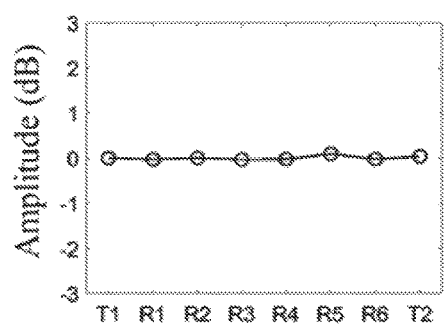
FIGS. 6A-6D include plots of differential of differential loop gain (dDLG) data used illustrating determination of a value of a pump laser degradation for an embodiment consistent with the present disclosure.
Figure 6B:
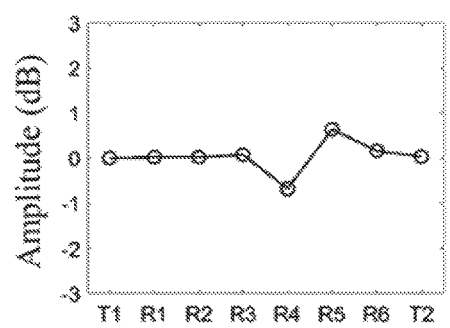
Figure 6C:
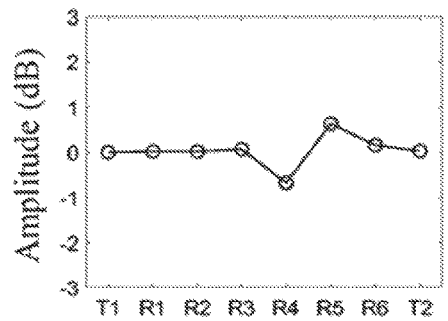
Figure 6D:
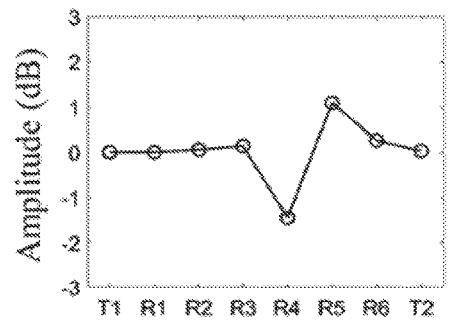

Consider a scenario where successive pump degradation faults at repeater R4 are detected in the system of FIG. 2 at times $t_1$ and $t_2$. FIGS. 6A-6D, include plots of amplitude (dB) of dDLG value vs. dDLG# associated with such a scenario. FIG. 6A illustrates dDLG data at a time $t_0$ when the system is without fault. In the no-fault state shown in FIG. 6A the dDLG data plot fluctuates only slightly around a zero value. At time $t_1$ a 2 dB pump degradation occurs at repeater R4, with the dDLG data shown in FIG. 6B. The signature in FIG. 6B may be stored and an injected into the baseline of future runs. At time $t_2$ a 3 dB pump degradation occurs resulting in the dDLG data shown in FIG. 6C, which is calculated using the new baseline with the signature of FIG. 6B injected therein. Because the previously stored signature from FIG. 6B is injected into the baseline, the dDLG data shown in FIG. 6C may be detected as a pump degradation fault at repeater R4 but it does not directly show the value of the fault occurring at time $t_2$. To calculate the value of the pump degradation occurring at time $t_2$, the signature in FIG. 6C is added to the previous fault signature in FIG. 6B to form a complete dDLG fault signature shown in FIG. 6D. The amplitude of the pump degradation fault occurring at time $t_2$ can by calculated from the dDLG data in 6D as being 3 dB.

Figure 7:
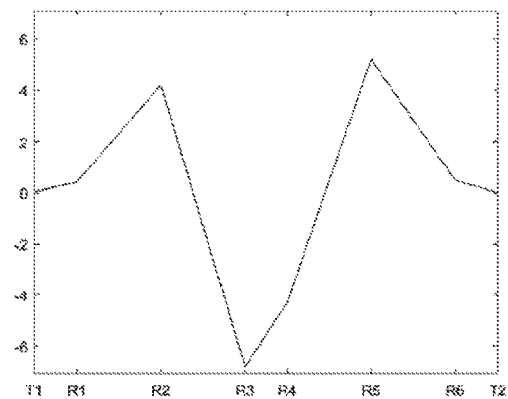
FIG. 7 includes a plot of dDLG data for a complete fault signature associated with a repeater failure for an embodiment consistent with the present disclosure.

With respect to a repeater failure fault, it is known that such a fault occurs when the pump lasers of the repeater fail. When a repeater failure occurs, the repeaters before and after the failed repeater are configured to attempt recovery of the loss of gain. FIG. 7, for example, includes a plot of amplitude (dB) of dDLG value vs. dDLG# associated with a failure of repeater R3 in the system illustrated in FIG. 2. When a repeater failure fault signature, such as shown in FIG. 7, is detected, since the gain of the repeater is a known constant value, the value of the fault may be reported as equal to the known constant value of the repeater gain.

With respect to a span loss fault, the value and directionality of span loss can be severely influenced by noise. To provide reliable identification of the directionality and value of span loss, a system and method consistent with the present disclosure may use optical time domain reflectometry (OTDR).

A variety of OTDR techniques are known. In general an OTDR signal source generates a test or probe signal, such as an optical pulse or a specially modulated optical carrier, and the test signal is launched into the outbound optical path of a path pair. Elements in the outbound path may reflect (e.g., backscatter) portions of the OTDR test signal. The backscattered signal portions may be returned on an inbound path, e.g. through an HLLB path, and detected in a receiver.

With reference again to FIG. 2, for example, in embodiments consistent with the present disclosure, the LME test signal transmitter LME1-TX may be configured to transmit an OTDR test signal in an outbound direction (with respect to the LME 140) on the transmission path 102a. The OTDR test signal may be reflected, e.g. at a fault location, and coupled through an HLLB path in an inbound direction (with respect to the LME 140) and received by the LME test signal receiver LME1-RX. The LME test signal transmitter LME2-TX may also be configured to transmit an OTDR test signal in an outbound direction (with respect to the LME 142) on the transmission path 102a. The OTDR test signal may be reflected, e.g. at a fault location, and coupled through an HLLB path in an inbound direction (with respect to the LME 142) and received by the LME test signal receiver LME2-RX.

In a system consistent with the present disclosure, the value and directionality of span loss in a system and method consistent with the present disclosure may be identified from a shift in the value of the received OTDR signals. For example, consider the scenario where LME 140 detects a span loss fault between repeaters R3 and R4 in FIG. 2. In response to detecting the span loss fault, the LME test signal transmitter LME1-TX may transmit an OTDR signal to identify the directionality and amount of the span loss.

Figure 8:
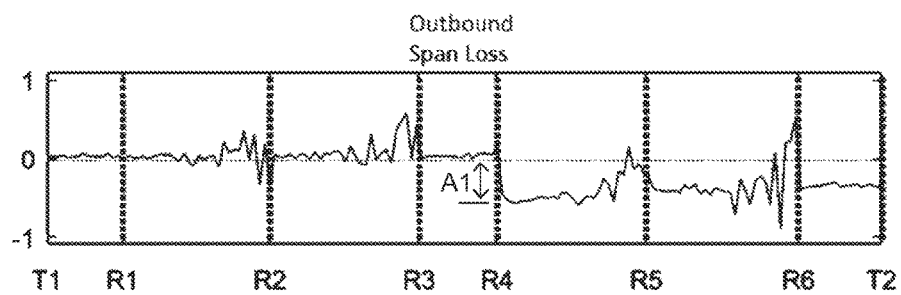
FIG. 8 includes a plot of OTDR data for an outbound span loss fault for an embodiment consistent with the present disclosure.
Figure 9:
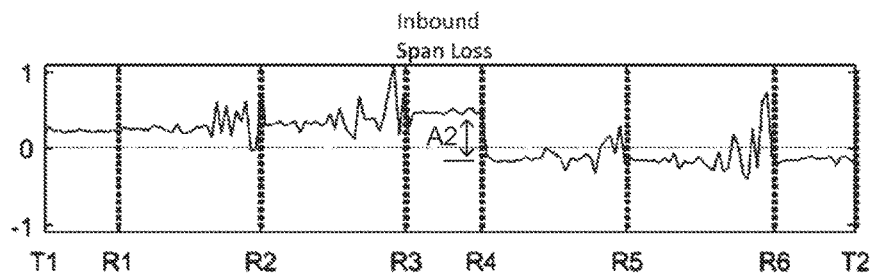
FIG. 9 includes a plot of OTDR data for an inbound span loss fault for an embodiment consistent with the present disclosure.

FIG. 8 illustrates amplitude (dB) vs. the loopback path associated with each transmitter, T1, T2 and repeater R1 . . . R6 for an OTDR data signal received in response to the OTDR signal at the LME test signal receiver LME1-RX when there is an outbound (with respect to LME 140) span loss. FIG. 9 illustrates amplitude (dB) vs. the loopback path associated with each transmitter, T1, T2 and repeater R1 . . . R6 for an OTDR data signal received in response to the OTDR signal at the LME test signal receiver LME1-RX when there is an inbound (with respect to LME 140) span loss. As shown in FIG. 8, if there is an outbound (with respect to LME 140) span loss between repeaters R3 and R4 in FIG. 2, then the OTDR data signal decreases in amplitude by an amount A1 after repeater R4. However, as shown in FIG. 9 if there is inbound (with respect to LME 140) span loss between repeaters R3 and R4, then then the OTDR data signal increases in amplitude by an amount A2 before repeater R3. The directionality of the span loss in a system and method consistent with the present disclosure may thus be determined by detecting whether the OTDR data signal is decreased after the span loss fault, in which case the span loss is an outbound span loss, or if it increased before the span loss, in which case the span loss is an inbound span loss.

In addition, the value of the span loss may be calculated using the values A1 and A2 along with the known span loss S between the repeaters R3 and R4 under a no fault condition. In particular, the inbound span loss SIB can be calculated as:

$$S_{IB} = \frac{A2}{A1 + A2} S \qquad \text{Equation (6)}$$

The outbound span loss SOB can be calculated as:

$$S_{OB} = \frac{A2}{A1 + A2} S \qquad \text{Equation (7)}$$

OTDR may also be used to accurately predict a break point in a fiber when a fiber break is detected by the LME. For example, consider the scenario where LME 140 detects a fiber break fault between repeaters R2 and R3 in FIG. 2. In response to detecting the fiber break fault, the LME test signal transmitter LME1-TX may transmit an OTDR signal to identify the location of the fiber break.

Figure 10:
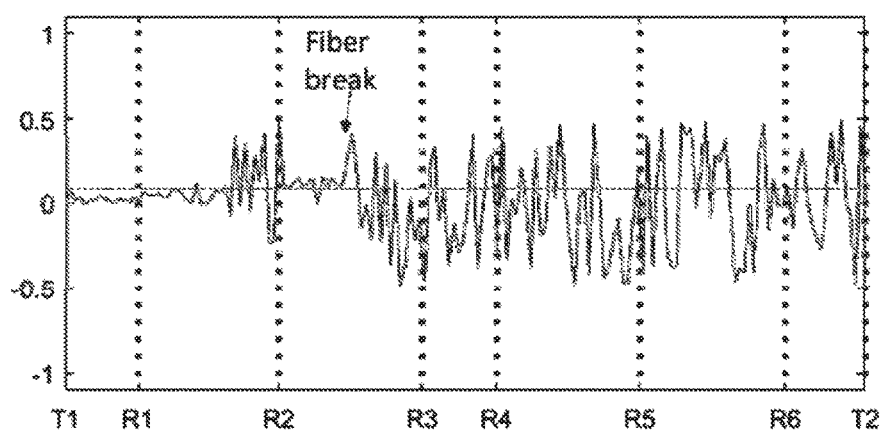
FIG. 10 includes a plot of OTDR data for a fiber break fault for an embodiment consistent with the present disclosure.

FIG. 10 illustrates amplitude (dB) vs. the loopback path associated with each transmitter, T1, T2 and repeater R1 . . . R6 for an OTDR data signal received in response to the OTDR signal at the LME test signal receiver LME1-RX when there is an outbound (with respect to LME 140) fiber break between R2 and R3. As shown in FIG. 10, if there is an outbound (with respect to LME 140) fiber break between repeaters R2 and R3, then OTDR signal cannot be received at the LME1-RX and the OTDR data signal shows only noise with a large noise amplitude (or noise floor). The location of the fiber break can thus be determined from the location in the OTDR data signal where the signal is lost and only noise is shown. For example, FIG. 10 shows the location of the fiber break between R2 and R3.

To provide accuracy in detecting faults that are exhibited by very small changes in dDLG data, instead of analyzing an averaged dDLG data say from multiple LME test signal runs and obtaining a single result, embodiments consistent with the present disclosure may involve analyzing dDLG data sets from multiple LME test signal runs and combining the results using a voting algorithm. The voting algorithm may be any algorithm that requires that a threshold number of dDLG data sets give the result of a fault before a fault is reported.

For example, in embodiments consistent with the present disclosure including 2N+1 dDLG data sets, if more than N of the data sets give the result a fault, a fault may be reported. Any dDLG data point recognized by the fault classifier in the previous runs may be asserted as recognized in the next 2N LME test signal runs. For this example, if the possibility of a false positive for a single LME test signal run is x, and if a fault is reported when more than N runs of the total 2N+1 runs give the result of a fault, then the possibility of a false positive ($P_{false}$) is:

$$P_{false} = x^{2N+1} + x^{2N}(1-x) + \ldots + x^{N+1}(1-x)^N \quad \text{Equation (8)}$$

If N=1, the $P_{false}$ becomes $x^2$. Assuming a false positive rate of 5%, the voting of three runs in this example reduces the false positive rate $P_{false}$ to 0.25%. Thus in embodiments consistent with the present disclosure, a voting algorithm allows reporting of the confidence of a small fault $P_{confidence}$ detected by a fault classifier as:

$$P_{confidence} = 1 - P_{false} \quad \text{Equation (9)}$$

In accordance with an aspect of the present disclosure there is provided an optical communication system is disclosed. The optical communication system includes: a plurality of repeaters coupled to the optical transmission path, each of the plurality of repeaters comprising a high loss loopback (HLLB) path; and line monitoring equipment (LME) coupled to the transmission path, the LME being configured to transmit a LME test signal on the optical transmission path and receive a LME loopback data from the optical transmission path in response to the LME test signal; and a processor. The processor is configured to: compare the LME loopback data to baseline loopback data to obtain a first fault signature; analyze the first fault signature using a first fault classifier to indicate a fault if the first fault signature matches a predetermined fault signature, the first fault classifier being a machine learning algorithm trained using the predetermined fault signature, and report a fault in the system if the first fault classifier indicates the fault.

In accordance with another aspect of the present disclosure there is provided a method of monitoring an optical transmission path in an optical communication system, the optical transmission path including a plurality of repeaters coupled to the transmission path, each of the repeaters comprising a high loss loopback (HLLB) path. The method includes: transmitting a first line monitoring equipment (LME) test signal on the transmission path; receiving a LME loopback data from the transmission path in response to the first LME test signal; comparing the LME loopback data to baseline loopback data to obtain a first fault signature; analyzing the first fault signature using a first fault classifier to indicate a fault if the first fault signature matches a predetermined fault signature, the first fault classifier being a machine learning algorithm trained using the predetermined fault signature; and reporting a fault in the system if the first fault classifier indicates the fault.

In accordance with other aspects of the present disclosure there are provided methods of reporting the value of a detected fault, and a voting algorithm for reporting a fault. Any aspect of the disclosure has utility alone and in combination with any other aspect disclosed herein.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the LMS 300 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An optical communication system comprising:
an optical transmission path;
line monitoring equipment (LME) coupled to the transmission path, the LME being configured to transmit a LME test signal on the optical transmission path and receive a LME loopback data from the optical transmission path in response to the LME test signal; and
a processor configured to:
compare the LME loopback data to baseline loopback data to obtain a first fault signature; and
analyze the first fault signature using a first fault classifier to indicate a fault if the first fault signature matches a predetermined fault signature, the first fault classifier being a machine learning algorithm trained using the predetermined fault signature, and report a fault in the system if the first fault classifier indicates the fault.

2. An optical communication system according to claim 1, wherein the LME loopback data is differential loopback data and the baseline loopback data is differential loopback data.

3. An optical communication system according to claim 1, wherein a number of data points in the LME loopback data is six or less.

4. An optical communication system according to claim 1, wherein the machine learning algorithm is trained with different amounts of noise added to the predetermined fault signature.

5. An optical communication system according to claim 1, wherein the LME test signal is transmitted at a first wavelength, and wherein the LME is configured to transmit a second LME test signal on the optical transmission path at a second wavelength and receive a second LME loopback data from the optical transmission path in response to the second LME test signal,
and wherein the processor is further configured to:
compare the second LME loopback data to the baseline loopback data to obtain a second fault signature;
analyze the second fault signature using the first fault classifier to indicate the fault if the second fault signature matches the predetermined fault signature; and
report a fault in the system if the first fault classifier and the second fault classifier both indicate the fault.

6. An optical communication system according to claim 1, wherein the processor is further configured to:
analyze the first fault signature using a second fault classifier to indicate the fault if the first fault signature matches the predetermined fault signature; and
report a fault in the system if the first fault classifier and the second fault classifier both indicate the fault.

7. An optical communication system according to claim 1, wherein the fault is a pump degradation fault and the processor is further configured to report the value of the fault in response to adding the first fault signature to a previous fault signature injected into the baseline loopback data.

8. An optical communication system according to claim 1, wherein the fault is a span loss fault and the LME is configured to transmit an OTDR test signal on the optical transmission path and receive OTDR test signal data from the optical transmission path in response to the OTDR test signal, and
wherein the processor is further configured to report a directionality of the span loss fault in response to a change in amplitude in the OTDR test signal data.

9. An optical communication system according to claim 1, wherein the fault is a span loss fault and the LME is configured to transmit an OTDR test signal on the optical transmission path and receive OTDR test signal data from the optical transmission path in response to the OTDR test signal, and
wherein the processor is further configured to report a value of the span loss fault in response to a change in amplitude in the OTDR test signal data.

10. An optical communication system according to claim 1, wherein the fault is a fiber break fault and the LME is configured to transmit an OTDR test signal on the optical transmission path and receive OTDR test signal data from the optical transmission path in response to the OTDR test signal, and
wherein the processor is further configured to report a location of the fiber break fault in response to a noise amplitude in the OTDR test signal data.

11. An optical communication system according to claim 1, wherein the LME is configured to transmit a plurality of the LME test signals, each at a different time to receive different associated sets of the LME loopback data,
and wherein the processor is further configured to:
compare each set of the LME loopback data to the baseline loopback data to obtain an associated first fault signature for each set of the LME loopback data;
analyze each of the associated first fault signatures using the first fault classifier to indicate the fault if the associated first fault signature matches the predetermined fault signature; and
report a fault in the system if a predetermined number of the associated fault signatures indicate the fault.

12. A method of monitoring an optical transmission path in an optical communication system, comprising:
transmitting a first line monitoring equipment (LME) test signal on the transmission path;
receiving a LME loopback data from the transmission path in response to the first LME test signal;
comparing the LME loopback data to baseline loopback data to obtain a first fault signature;
analyzing the first fault signature using a first fault classifier to indicate a fault if the first fault signature matches a predetermined fault signature, the first fault classifier being a machine learning algorithm trained using the predetermined fault signature; and
reporting a fault in the system if the first fault classifier indicates the fault.

13. A method according to claim 12, the method further comprising training the machine learning algorithm with different amounts of noise added to the predetermined fault signature.

14. A method according to claim 12, wherein the LME test signal is transmitted at a first wavelength, and the method further comprises:
transmitting a second LME test signal on the optical transmission path at a second wavelength;
receiving second LME loopback data from the optical transmission path in response to the second LME test signal;

comparing the second LME loopback data to the baseline loopback data to obtain a second fault signature; and analyzing the second fault signature using the first fault classifier to indicate the fault if the second fault signature matches the predetermined fault signature, and wherein the reporting comprises reporting a fault in the system if the first fault classifier and the second fault classifier both indicate the fault.

15. A method according to claim 12, the method further comprising analyzing the first fault signature using a second fault classifier to indicate the fault if the first fault signature matches the predetermined fault signature, wherein the reporting comprises reporting the fault in the system if the first fault classifier and the second fault classifier both indicate the fault.

16. A method according to claim 12, wherein the fault is a pump degradation fault and the method further comprises adding the first fault signature to a previous fault signature injected into the baseline loopback data, and wherein the reporting comprises reporting a value of the fault in response to the adding.

17. A method according to claim 12, wherein the fault is a span loss fault and the method further comprises:

transmitting an OTDR test signal on the optical transmission path;

receiving an OTDR test signal data from the optical transmission path in response to the OTDR test signal; and reporting a directionality of the span loss fault in response to a change in amplitude in the OTDR test signal data.

18. A method according to claim 12, wherein the fault is a span loss fault and the method further comprises:

transmitting an OTDR test signal on the optical transmission path;

receiving an OTDR test signal data from the optical transmission path in response to the OTDR test signal; and reporting a value of the span loss fault in response to a change in amplitude in the OTDR test signal data.

19. A method according to claim 12, wherein the fault is a fiber break fault and the method further comprises:

transmitting an OTDR test signal on the optical transmission path;

receiving an OTDR test signal data from the optical transmission path in response to the OTDR test signal; and reporting a location of the fiber break fault in response to a noise amplitude in the OTDR test signal data.

20. A method according to claim 12, wherein the LME is configured to transmit a plurality of the LME test signals, each at a different time to receive different associated sets of the LME loopback data, wherein the comparing comprises comparing each set of the LME loopback data to the baseline loopback data to obtain an associated first fault signature for each set of the LME loopback data, wherein the analyzing comprises analyzing each of the associated first fault signatures using the first fault classifier to indicate the fault if the associated first fault signature matches the predetermined fault signature, and the reporting comprises reporting a fault in the system if a predetermined number of the associated fault signatures indicate the fault.

* * * * *